Patented Aug. 14, 1951

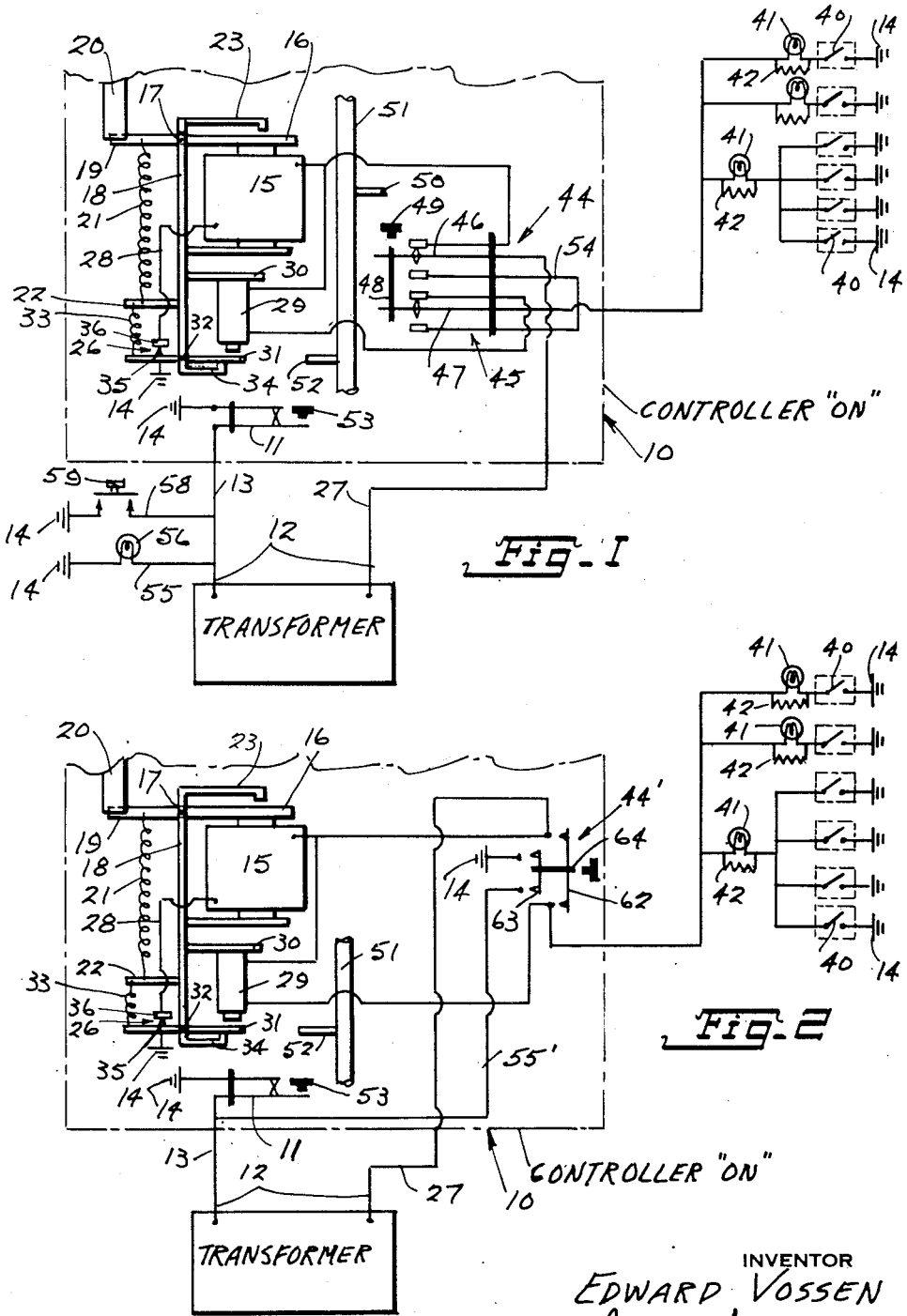

2,564,413

UNITED STATES PATENT OFFICE 2,564,413

LIGHT INDICATOR FOR STOP MOTIONS OF KNITTING MACHINES

Edward Vossen, Lynbrook, N. Y., assignor to Stop-Motion Devices Corp., Brooklyn, N. Y., a corporation of New York Application September 27, 1949, Serial No. 118,026

7 Claims. (Cl. 66—157)

This invention relates to new and useful improvements in light indicators for stop motions of knitting machines.

Heretofore, light indicators have been used for stop motions of knitting machines which used controllers which knocked "off" only upon the passage of current through them from any one or more of the detector switches. Recently, a new type of controller has been placed on the market through which current flows when the controller is in an "on" position and which knocks off when said current fails or when current reaches the controller upon the closing of one or more detector switches connected therewith. It has been found that when the usual old type of light indicators are used with this new type of controller, the controller degenerates and goes out of operation within a short time.

The reason that the new controller cannot use an old light indicator is that it contains a relay having a sensitive winding. This relay is energized by the operation of one or more of the detector switches. This relay contains a relay switch through which a relatively large amount of current flows because this relay switch is connected in series with a large coil of the controller used to operate the releasing trip of the controller. It has been found that the contacts of this relay switch soon become pitted and portions burn away. This is highly objectionable since it quickly degenerates the sensitivity and operation of the controller. Moreover, the use of an old light indicator with the new controller causes an objectionable buzzing after the controller has knocked "off" because current is caused to flow through the coils thereof when the light indicator is operated. This also is objectionable.

This invention proposes new and improved light indicators which overcome the objectionable features of the old indicators pointed out above. More particularly, it is proposed that the new light indicators operate in a manner so as to avoid current flowing through the coils of the controller after it has knocked "off" in order to eliminate the objectionable buzzing and to eliminate the objectionable pitting and burning away of the points of the relay switch.

This new light indicator may be used in all types of controllers now on the market, namely those which are of the "push pull" type, as well as the "rotary" type.

Another object of this invention resides in providing an arrangement in which the electric current by-passes the coils of the controller when the light indicators are operated in order to avoid the objectionable features discussed above.

This invention also proposes so constructing the light indicators that they may operate automatically upon the knocking "off" of the controller, or they may be operated by the manual closing of switch means after the controller has knocked "off."

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a schematic view of one form of new light indicator for a stop motion of a knitting machine constructed in accordance with this invention.

Fig. 2 is a view similar to Fig. 1, but of a modified form of light indicator constructed in accordance with this invention.

The new light indicator, in accordance with that form of the invention disclosed in Fig. 1, may be best understood by first referring to the new type of electric controller to which this invention relates. One such controller is disclosed in the patent application of Edward Vossen, entitled Electric Controller Stop Motions for Machines, Serial No. 26,335, filed May 11, 1948, upon which Patent No. 2,490,936 was granted on December 13, 1949.

The new light indicator is used in combination with a stop motion for a knitting machine having an electric controller 10 provided with a main switch 11 preferably of the push button type, which is closed when the controller 10 is "on," and open when the controller 10 is "off." An electric circuit 12 has one of its lines 13 connected to ground 14 through said main switch 11. Said electric controller 10 also is provided with a large main electric coil 15 for tripping the mechanism of the controller 10 when de-energized. This main coil 15 when energized attracts an armature 16 which is pivotally mounted by the pintle 17 upon a bracket 18. The armature 16 has a tail end 19 which normally engages and holds the releasing trip 20 of the mechanism of the controller 10. A spring 21 connected between the armature 16 and a lug 22 formed on the bracket 18, urges the armature 16 to release the releasing trip 20. A stop arm 23 projects from the bracket 18 and limits pivoting of the armature 16 to its "off" position.

Said electric controller 10 also has a normally closed relay switch 26. Said circuit 12 has its other line 27 normally connected with the main coil 15 and then connected by a lead 28 through said relay switch 26 to the ground 14. Said controller 10 is also provided with a small relay coil 29 for opening the relay switch 26. This relay coil 29 is normally connected with said second-mentioned line 27 in parallel with said main coil 15. The relay coil 29 is mounted on a lug 30 on the bracket 18. The relay coil 29 is adapted when energized to attract an armature 31 which is pivotally mounted by pintle 32 upon the bracket 18. A spring 33 connects with the rear end of the armature 31 and with the lug 22 for normally urging the armature 31 into an open position against a stop arm 34 on the bracket 18. The switch 26 comprises a contact 35 mounted on the armature 31 and normally engaging a stationary contact 36 connected with the lead 28.

A plurality of normally open detector switches 40 are connected in parallel with each other and in series with said relay coil 29. Said relay coil 29 is connected to the ground 14 through said detector switches 40. Electric lamps 41 are associated with said detector switches 40, and each electric lamp 41 is connected in series with one or more of said detector switches 40. Each lamp 41 is shunted with a resistance 42. Switch means 44 is provided for electrically by-passing the main coil 15 and said relay coil 29 in order to connect said second-mentioned line 27 directly to the lamps 41 and detector switches 40. The switch means 44 includes a double pole double throw push button switch 45 or similar switch. Reference numerals 46 and 47, respectively indicate the poles of said switch 45.

These poles 46 and 47 are connected by an insulation bridge 48 which is resiliently urged into one position in the usual way, not illustrated on the drawing. The switch 45 is schematically illustrated as having a push button 49. This push button 49 is operated by a pin 50 projecting from a rod 51, or other part, of the controller 10 which assumes one position when the controller is "on," and a second position when the controller is "off." The rod 51 is illustrated as provided with a second pin 52 engageable with a push button 53 for operating the normally closed switch 11. The rod 51 is illustrated in a position in which the controller is "on." When the controller knocks "off" the rod 51 will move so that the pins 50 and 52, respectively, engage the push buttons 49 and 53, throwing the switch 45 into its second position and opening the switch 11. Said switch means 44 also includes a by-pass conductor 54 connecting the normally inoperative contacts of the double pole double throw switch 45 for switching said second mentioned line 27 from said coils 15 and 29 through said by-pass conductor 54 to said lamps 41 and detector switches 40.

A normally inoperative auxiliary ground connection 55 connects said first-mentioned line 13 of said circuit 12 with the ground 14 and is arranged to assume an operative condition when the controller 10 knocks "off." The ground connection 55 includes, in series, a high resistance lamp 56. When the controller 10 knocks "off" current flows through the lamp 56 which then becomes illuminated and calls attention to the fact that the controller 10 has knocked "off." A mill usually has a large number of knitting machines, which when operating make sufficient noise so that the operator cannot detect when any one particular knitting machine stops operating. However, the operator's attention is easily attracted by the signal lamp 56 when it lights up. Another ground connection 58 is connected with the lead 13 and the ground 14 and shunts the ground connection 55. This second ground connection 58 is provided with a normally open push button switch 59 which may be closed to shunt the lamp 56 so that additional current is supplied to the particular detector switch or switches 40 which operated to stop the controller 10 so that one or more of the signal lamps 41 light up to indicate to the operator which detector switch or switches, or group of detector switches caused the knitting machine to stop.

The controller 10 is substantially identical in construction and operation to the controller shown in Fig. 5 of the patent to Vossen No. 2,490,936. Rod 51 corresponds to rod 10 in the patent which is moved by the spring 14. Trip 20 corresponds to the trip 17 in the patent, which frees rod 10 so that spring 14 may move rod 10.

The operation of this form of the invention may be understood from the following:

The controller 10 is illustrated as shown in its "on" position. In this condition current is continuously flowing from the line 27 through the pole 46 of the switch 45, the main coil 15, the lead 28, the normally closed relay switch 26, the ground 14, then through the normally closed main switch 11, to the lead 13 of the circuit 12. The main coil 15 is thus energized and holds its armature 16, which in turn holds the releasing trip 20 of the controller 10. Should the current fail in the circuit 12, due to accidental pulling out of the electric plug which supplies current to the primary of the transformer feeding the circuit 12, or due to other reasons for current failure to the transformer, the main coil 15 becomes de-energized and then the spring 21 moves the armature 16 to release the releasing trip 20 which knocks "off" the controller and stops the knitting machine. When the controller 10 knocks "off" the rod 51 moves so that the pins 50 and 52 operate the push buttons 49 and 53, throwing the switch 45 and opening the switch 11. If current now starts flowing again in the circuit 12 the lamp 56 will light up. The operator may now test to ascertain which detector switches closed and caused the controller to knock "off." To do this the push button switch 59 is closed to shunt the lamp 56. Since the controller knocked "off" because of power failure in the circuit 12 none of the lamps 41 will light up, indicating that there is no further trouble. The operator may now manually "load" the controller 10 and restart the knitting machine.

If one or more of the detector switches 40 are closed, the loaded controller 10 will also knock "off," because current then flows through the line 27, the pole 46, the relay coil 29, the pole 47, one or more of the lamps 41, and the closed detector switch or switches 40 to the ground 14, and then through the main switch 11, to the lead 13 of the circuit 12. When current flows in coil 29 this coil becomes energized and attracts armature 31 which then opens switch 26, which opens the circuit through the main coil 15. Therefore, coil 15 becomes de-energized and spring 21 then pivots armature 16 which now releases trip 20 causing the controller 10 to knock "off." When the controller 10 knocks "off," the rod 51 assume its second position in which the pins 50 and 52, respectively, engage the push buttons 49 and 53, throwing the switch 45 to its second position and opening the main switch 11. The lamp 56 immediately lights up, indicating that the controller 10 has knocked "off" because current may flow from the lead 27 to the pole 46, through the line 54, the pole 47, the lamps 41, and the particular detector switch or switches 40 which were closed, the ground 14, the ground connector 55 to the line 13. The lamps 41 receive less current than the lamp 56 because of the resistances 42 and consequently only the lamp 56 lights up to indicate the controller 10 has knocked "off." The operator may now close the push button switch 59 to shunt the lamp 56 and then sufficient current is supplied to light up the lamp or lamps 41 which are in series with the detector switch or switches 40 which are closed. The operator now knows where to look for the cause of the closing of the particular detector switches 40, and upon correction of the cause may restart the knitting machine.

In Fig. 2 a modified form of the invention has been disclosed which is very similar to the first form of the invention, distinguishing merely in the elimination of lamp 56 and in the details of the switch means 44. In this form of the invention identical reference numerals have been used to indicate identical parts of the stop motion shown in Fig. 1. This light indicator includes switch means 44' used to electrically by-pass the main coil 15 and the relay coil 29 in order to connect the second-mentioned line 27 directly with the lamps 41 and detector switches 40. A normally inoperative auxiliary ground connection 55' is connected with said first-mentioned line 13 of the circuit 12 and is arranged to become operative when the controller 10 knocks "off."

Said switch means 44' includes a normally open double pole push button switch 64 having a pole 62 connected in the line 27 to shunt the coils 15 and 29. Said auxiliary ground connection 55' includes in series the second pole 63 of said open push button switch 64. The push button switch 64 is manually operated. For this reason the rod 51 when moving to its second position, when the controller knocks "off," merely has the pin 52 engage and operate the push button 53 of the main switch 11.

In other respects this form of the invention is identical to the previous form.

Its operation may be understood from the following:

When the controller 10 is "on" current flows from the line 27 through the main coil 15, the lead 28, the relay switch 26, to the ground 14, then through the main switch 11, to the lead 13 of the circuit 12. If current in the circuit 12 fails, the main coil 15 becomes deenergized and the spring 21 will move the armature 16 to release the releasing trip 20 which knocks "off" the controller 10, stopping the knitting machine. The operator upon noting that the knitting machine has stopped may manually close the push button switch 64. If none of the lamps 41 light up he knows that current failure caused the controller 10 to knock "off."

When one or more of the detector switches 40 close, because of one or more broken yarns, or the ends of yarns passing the detector switches, or because of knots, the controller will knock "off" because current will flow from the line 27 through the relay coil 29, to and through the closed detector switch 40 to the ground 14, and then through the main switch 11 to the line 13. The operator may close the push button switch 64 to cause one or more of the lamps 41 to light up to indicate which one or more of the detector switches 40 closed. The circuit may be traced from the line 27, through the pole 62, through the particular lamp or lamps 41, the particular closed detector switch or switches 40, the ground 14, then through the pole 63, the auxiliary ground connection 55', to the lead 13.

It should be particularly noted that in each of the forms of the invention, shown in Figs. 1 and 2, the indicator lamp or lamps 41 which indicate a closed detector switch or switches 40 may be lit up by by-passing the current from the coils 15 and 29 and causing the current to flow through the particular lamp or lamps 41 and the particular detector switch or switches 40. This is important because with this arrangement, testing current will not be caused to flow through the coils 15 and 29 and through the relay switch 26. Because current does not flow through said coils, the "off" controller will not buzz or hum, and moreover, the contacts of the relay switch 26 will not become pitted and burned.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off."

2. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said switch means comprising a double pole double throw switch and a by-pass conductor for switching said second mentioned line from said coils to said by-pass conductor, and then directly to said lamps and detector switches.

3. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said switch means comprising a double pole double throw switch and a by-pass conductor for switching said second mentioned line from said coils to said by-pass conductor, and then directly to said lamps and detector switches, and means for automatically operating said switch means when said controller knocks "off" and is manually loaded.

4. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said auxiliary ground connection comprising a ground connection and a signal lamp connected in series in said ground connection.

5. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said auxiliary ground connection comprising a ground connection and a signal lamp connected in series in said ground connection, and a push button switch shunting said signal lamp.

6. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said switch means comprising a normally open push button switch shunting said coils.

7. In combination with a stop motion of a knitting machine having an electric controller provided with a main switch closed when the controller is "on" and open when the controller is "off," an electric supply circuit having one line connected to ground through said main switch, said electric controller also being provided with a main coil for tripping the controller mechanism when de-energized, said electric controller also having a normally closed relay switch, said circuit having its other line connected with said main coil and through said relay switch to ground, said controller also being provided with a relay coil for opening said relay switch and connected with said second mentioned line and in parallel with said main coil, a plurality of normally open detector switches connected in parallel with each other and in series with said relay coil, said relay coil being connected to ground through said detector switches, electric lamps each in series with one or more of said detector switches, switch means for electrically by-passing said main coil and said relay coil in order to connect said second mentioned line directly with said lamps and detector switches, and a normally inoperative auxiliary ground connection connected with said first mentioned line of said circuit and operative when said controller knocks "off," said switch means comprising a normally open push button switch shunting said coils, said auxiliary ground connection including a normally open push button switch connected for gang operation with said last named switch.

EDWARD VOSSEN.

REFERENCES CITED

The following references are of record in the file of this patent:

UNITED STATES PATENTS

| Number | Name | Date |
|---|---|---|
| 2,383,838 | Auble | Aug. 28, 1945 |
| 2,432,953 | Vossen | Dec. 16, 1947 |
| 2,488,614 | Antonevich | Nov. 22, 1949 |